United States Patent
Lappas et al.

(10) Patent No.: US 6,232,373 B1
(45) Date of Patent: May 15, 2001

(54) PRODUCTION AND USE OF FORMULATIONS CONSISTING OF CELLULOSE, KALIUM CASEINATE AND CROSS-LINKED VINYLPYRROLIDONE HOMOPOLYMERS AND/OR VINYLIMIDAZOL/VINYLPYRROLIDONE COPOLYMERS

(75) Inventors: Michael Lappas, Grünstadt; Bernhard Fussnegger, Kirrweiler; Gabriele Müller, Wasserburg; Knuth Horst Jung, Tuntenhausen; Georg Tasser, Schonstett, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/319,878

(22) PCT Filed: Dec. 4, 1997

(86) PCT No.: PCT/EP97/06779

§ 371 Date: Jun. 14, 1999

§ 102(e) Date: Jun. 14, 1999

(87) PCT Pub. No.: WO98/27150

PCT Pub. Date: Jun. 25, 1998

(30) Foreign Application Priority Data

Dec. 18, 1996 (DE) .............................. 196 52 697

(51) Int. Cl.⁷ .................................. C08L 1/00; A23L 2/00
(52) U.S. Cl. .................... 524/18; 426/330.3; 426/330.4; 426/330.5; 426/422; 426/487; 426/592
(58) Field of Search .................... 524/18; 426/330.3, 426/330.4, 330.5, 422, 487, 592

(56) References Cited

U.S. PATENT DOCUMENTS 4,008,339 * 2/1977 Matsuda et al. .................. 426/330.4
4,451,582 5/1984 Denzinger et al. .................... 521/38
5,744,183 * 4/1998 Ellsworth et al. ................ 426/330.4

FOREIGN PATENT DOCUMENTS 88 964   9/1983  (EP) .
235 887  5/1986  (NL) .
442268 * 8/1975  (SU) .

OTHER PUBLICATIONS

Chem. Abstr. vol. 125, No. 15 (1996), Abstr. 194044.
Derwent Publ. An 89–058096.

* cited by examiner

Primary Examiner—Ana Woodward
(74) Attorney, Agent, or Firm—Keil & Weinkauf

(57) ABSTRACT

The preparation and the use of pulverulent compositions consisting of
  (a) from 10 to 90% by weight of cellulose,
  (b) from 5 to 60% by weight of an alkali metal caseinate, and
  (c) from 5 to 85% by weight of a polymer
    $c_1$) an N-vinyllactam polymer obtained by copolymerization of from 90 to 99.5% by weight of one or more N-vinyllactam monomers and from 0.5 to 10% by weight of a crosslinking monomer, or
    $c_2$) a polymer obtained by copolymerization of from 50 to 99.5% by weight of at least one vinyl heterocyclyl monomer having a $PK_a$ of at least 3.8, from 0 to 49.5% by weight of another copolymerizable monomer and from 0.5 to 10% by weight of a crosslinking monomer, or
    $c_3$) a mixture of the polymers $c_1$) and $c_2$).

The compositions are used in the treatment of biological liquids of plant origin in an unfermented or partially or completely fermented state for sensory stabilization of the liquids with a view to preserving taste and color.

22 Claims, No Drawings

PRODUCTION AND USE OF FORMULATIONS CONSISTING OF CELLULOSE, KALIUM CASEINATE AND CROSS-LINKED VINYLPYRROLIDONE HOMOPOLYMERS AND/OR VINYLIMIDAZOL/VINYLPYRROLIDONE COPOLYMERS

The present invention relates to formulations consisting of cellulose, alkali metal caseinate and crosslinked homopolymers or copolymers of N-vinyllactams and/or polymers based on a basic N-vinyl heterocycle having a $PK_a$ of at least 3.8, their preparation and use for treating biological liquids of plant origin in an unfermented, partially fermented or completely fermented state.

In the production of liquid products from unfermented, partially fermented or completely fermented precursors, their stability with regard to color, aroma and taste is an outstanding feature. These three features are dependent in biological liquids of plant origin on the concentration of phenolic constituents and the content of heavy metal ions. Controlled adjustment of the concentration of these constituents is thus a critical precondition for the production of end products with stable sensory properties.

To influence phenolic substances, products have previously been used which react by complexing, adsorption or precipitation. Suitable products are native proteins such as gelatine, caseinate, egg white, ovalbumin, isinglass or dried blood, as well as modified proteins such as potassium caseinate. In addition, crosslinked polymers based on vinylpyrrolidone (Crospovidone, PVPP) are used. Thus, EP-A-088 964 describes a process for preparing insoluble polymers which are only slightly swellable in water of a basic N-vinylheterocycle and its copolymers with up to 30% by weight of copolymerizable monomer. Complexing transition metal cations to prepare catalysts based on the described polymers is proposed. These polymers have a broad spectrum of applications, especially as adsorber resins. They adsorb proteins, especially enzymes, very well, and are likewise suitable for removing interfering polyphenols and colorants from aqueous solutions by adsorption.

The native and modified proteins, as well as the crosslinked polymers, have the disadvantage that they require a certain pretreatment by swelling. This is highly time-consuming. Since the great majority of the products are removed from the medium used, together with the suspended turbidities, by sedimentation, this step is also highly time-consuming and can take up to 6 weeks. Furthermore, these products have the disadvantage that they do not remove all phenolic substances or classes of substances to the same extent, but there is in each case a preferred interaction with a certain group of phenolic substances. The sediments produced are generally slimy pasty compositions from which liquid is taken off by a downstream treatment, in order to bring them into a reutilizable or landfillable state.

It is an object of the present invention, therefore, to find a product which does not have the abovementioned disadvantages and is able to decrease the content of various groups of phenolic compounds and simultaneously also decrease the concentration of dissolved heavy metals. At the same time, the handleability should be improved by avoiding the complex preparation phase of the starting material.

We have found that this object is achieved by solid preparations consisting of (a) from 10 to 90% by weight of cellulose,
(b) from 5 to 60% by weight of an alkali metal caseinate and
(c) from 5 to 85% by weight of a polymer selected from the group consisting of:
  $c_1$) an N-vinyllactam polymer obtained by copolymerization of from 90 to 99.5% by weight of one or more N-vinyllactams and from 0.5 to 10% by weight of a crosslinker or
  $c_2$) of a polymer of from 50 to 99.5% by weight of at least one basic vinylheterocycle having a $pK_a$ of at least 3.8 and from 0 to 49.5% by weight of another copolymerizable monomer as well as from 0.5 to 10% by weight of a crosslinker,
  or mixtures of the polymers $c_1$) and $d_2$);

the invention also relates to their preparation and use.

For the purposes of the invention, cellulose (a) is the various forms of cellulose such as cellulose fibers, micronized cellulose, fibrillated cellulose or microcrystalline cellulose which have bulk densities from 0.15 to 0.45 g/cm$^3$, mean fiber lengths from 15 $\mu$m to 900 $\mu$m and a mean fiber diameter from 5 $\mu$m to 50 $\mu$m.

For the purposes of the invention, an alkali metal caseinate (b) is especially potassium caseinate, which is obtained by treating casein with potassium hydroxide solution or solutions of alkaline potassium salts of organic or inorganic acids, such as phosphoric acid or citric acid.

Casein originates from short-time heat-treated skimmed milk which has a maximum fat content of 0.05%. The skimmed milk, to separate off the whey, is coagulated with acids by setting the pH to the isoelectric point of casein, 4.5±0.2. After heat treatment, separating off the whey and washing with warm water, the crude casein is obtained. This is further processed as wet curd, or after drying, to give caseinate, by solubilizing it by adding potassium hydroxide or other alkali metal hydroxides. It is dried by spray-drying or an extrusion process. The products obtained which are particularly suitable for preparing the formulations according to the invention have a water content from 5 to 10% and a protein content from 87% to 92%, as well as an ash content from 3% to 8%.

For the purposes of the invention, N-vinyllactams $c_1$) are 3-methyl-N-vinylpyrrolidone, in particular N-vinylcaprolactam and N-vinylpyrrolidone (VP), which are used alone or in a mixture with one another.

The monomers $c_1$) are used in an amount of from 90% to 99.5%, preferably from 98% to 99% by weight, based on the total polymer.

Suitable crosslinkers are those which contain, per molecule, two or more vinyl groups which can be copolymerized by a free radical mechanism. Those which are particularly suitable are alkylenebisacrylamides, such as methylenebisacrylamide and N,N'-bisacryloylethylenediamine, in addition N,N'-divinylethyleneurea, N,N'-divinylpropyleneurea, ethylidene-bis-3-(N-vinylpyrrolidone) and N,N'-divinyldiimidazolyl-(2,2')-1,4-butane and 1,1'-bis(3,3'-vinylbenzimidazolid-2-one)-1,4-butane. Other useful crosslinkers are, for example, alkylene glycol di(meth)acrylates, such as ethylene glycol di(meth)acrylate and tetramethylene glycol di(meth)acrylate, aromatic divinyl compounds, such as divinylbenzene and divinyltoluene, and alkyl acrylate, divinyldioxane, pentaerythritol triallyl ethers and their mixtures. When polymerization is carried out in the presence of water, obviously they are only suitable if they are soluble in the aqueous monomer mixture.

The crosslinkers are used in an amount of 0.5–10, preferably 1–2, % by weight, based on all monomers of the polymer.

For the purposes of the invention, basic vinyl heterocycles $c_2$) are saturated and aromatically unsaturated heterocycles having a vinyl and at least one basic tertiary ring nitrogen having a $pK_a$ of at least 3.8. In addition to the vinyl, the ring may also bear alkyls having 1 to 4 carbons, phenyls or benzyls, or else a fused second ring. Specific examples are: N-vinylimidazole (Vl) and derivatives thereof, such as 2-methyl-1-vinylimidazole, 4-methyl-1-vinylimidazole, 5-methyl-1-vinylimidazole, 2-ethyl-1-vinylimidazole, 2-propyl-1-vinylimidazole, 2-isopropyl-1-vinylimidazole, 2-phenyl-1-vinylimidazole and 1-vinyl-4,5-benzimidazole. In addition, the following may be used, for example: 2-vinylpyridine, 4-vinylpyridine and 2-methyl-5-vinylpyridine. Obviously, mixtures of basic vinyl heterocycles with one another can also be used.

Preferred monomers for this are N-vinylimidazole and 2-methyl-N-vinylimidazole.

These monomers are used in an amount of 50–99.5, preferably 60–96, % by weight, based on the total polymer.

The comonomers are copolymerized in amounts of up to 49.5, preferably up to 30, % by weight, particularly preferably up to 20% by weight, based on the total monomer mixture. Suitable comonomers are, for example, styrene, acrylic esters, vinyl esters, acrylamides and N-vinyldihydropyridines. Preferably, N-vinyllactams, such as 3-methyl-N-vinylpyrrolidone, in particular N-vinylcaprolactam and N-vinylpyrrolidone (VP), are used as comonomer(s).

Suitable crosslinkers for the polymers $c_2$) are likewise those which contain two or more vinyls per molecule which can be copolymerized by a free-radical mechanism. Those which are particularly suitable are alkylenebisacrylamides, such as methylenebisacrylamide and N,N'-bisacryloylethylenediamine, and in addition N,N'-divinylethyleneurea, N,N'-divinylpropyleneurea, ethylidenebis-3-(N-vinylpyrrolidone) as well as N,N'-divinyldiimidazolyl-(2,2')-1,4-butane and 1,1'-bis(3,3'-vinyl-benzimidazolid-2-one)-1,4-butane. Other useful crosslinkers are, for example, alkylene glycol di(meth) acrylates, such as ethylene glycol di(meth)acrylate and tetramethylene glycol di(meth)acrylate, aromatic divinyl compounds, such as divinylbenzene and divinyltoluene, as well as allyl acrylate, divinyldioxane, pentaerythritol triallyl ether and their mixtures. When polymerization is carried out in the presence of water, obviously they are only suitable if they are soluble in the aqueous monomer mixture.

The crosslinkers are equally used for the polymers $c_2$) in an amount of 0.5–10, preferably 1–4, % by weight, based on all monomers of the polymer.

Celluloses (a) which are particularly highly suitable for the use according to the invention are those which contain less than 1% of water-soluble substances and have a fiber length of from 20 $\mu$m to 200 $\mu$m, preferably from 25 to 50 $\mu$m, and a fiber diameter of from 5 $\mu$m to 50 $\mu$m, preferably from 10 to 20 $\mu$m.

Alkali metal caseinates (b) which are particularly highly suitable for the use according to the invention are potassium caseinates having a high solubility, preferably greater than 99%, and high bacteriological requirements, preferably having a total cell count of less than 5000 CFU/g, yeasts below 10/g and molds below 10/g.

Polymers $c_1$) which are particularly highly suitable for the use according to the invention are those of N-vinylpyrrolidone (VP) and N,N'-divinylethyleneurea (DVEU), in particular those of 98–99.5% by weight VP and 0.5–2.0% by weight DVEU.

Polymers $c_2$) which are particularly highly suitable for the use according to the invention are those of N-vinylimidazole (VI), N-vinylpyrrolidone (VP) and N,N'-divinylethyleneurea (DVEU), in particular those of 80–90% by weight VI, 5–15% by weight VP and 2–5% by weight DVEU.

In EP-A-4 38713 which corresponds to U.S. Pat. No. 4,451,582, polymers $c_2$) of this type are used to remove heavy metals from wine and wine-like beverages. This publication is expressly incorporated herein by reference with regard to the preparation of the polymers.

The particle size distribution of the polymer particles $c_1$) and $c_2$) is customarily in the range 0.01–100 $\mu$m, preferably in the range 5–50 $\mu$m.

In a process variant 1, the preparation is prepared in such a manner that the cellulose (a) and the polymers $c_1$) and/or $c_2$) are suspended in a solution of alkali metal caseinate (b), preferably in a concentration of from 2% by weight to 20% by weight of dry matter. The concentrations of the components $c_1$) and/or $c_2$) are from 2% to 20% of the dry matter of the suspension.

The suspension is spray-dried, preferably using a single-component nozzle at pressures of from 50 bar to 150 bar, preferably below 100 bar.

In a further process variant (process variant 2), the components (a) and (b) are introduced as explained in process variant 1, by suspending the cellulose (b) in an aqueous solution of the alkali metal caseinate. This suspension is then atomized, the resulting primary aerosol being brought in the moist state directly into contact with the pulverulent polymer components and the resulting polymer-containing suspension droplets being dried. The components $c_1$) and/or $c_2$) are correspondingly injected dry into the atomization zone of the tower.

In a further possible preparation method (process variant 3), powders are prepared according to process variants 1 or 2, initially dried to a residual moisture content of from 10 to 15% by weight in the tower and to achieve an additional agglomeration effect, are discharged onto a belt for post-drying at a powder temperature of from 70° C. to 400° C., preferably from 60° C. to 50° C., and are set to a residual moisture content of 6–10% by weight at an air inlet temperature of 60° C. to 110° C. Post-drying at elevated temperature gives an additional agglomeration effect.

The preparations are used in such a manner that they are added to the medium used in powder form and without pretreatment. Their action begins immediately after wetting the formulation. For treating biological liquids of plant origin in unfermented state, a dosage of from 5 to 150 g/hl, preferably of from 10 to 50 g/hl, is used. Partially fermented or completely fermented biological liquids of plant origin are treated with from 25 to 250 g/hl, in a preferred form with 40 to 150 g/hl, and in a particularly preferred usage form, at dose rates of from 50 to 100 g/hl. Suitable liquids are, in particular, wine, grape must or wine-like beverages and their unfermented musts (berry and fruit juices).

To separate off the formulations from the medium used, all forms of solid/liquid separation are suitable, such as, for example, centrifuges, decanters, layer and kieselguhr filtration, as well as membrane techniques.

In these processes, it has surprisingly been found that the filtration properties markedly improve with the solid constituents separated off by this process, consisting of the added formulations and the turbidity particles suspended in the medium used, since the filtration medium resistance $\beta$ and the mean filter cake resistance $\alpha$ markedly decrease. These parameters are determined using the Carman equation $$dV_f/dt = \Delta p \cdot A / \eta_f (\beta + \alpha \cdot w_s \cdot V_f / A)$$

where $V_f$ is filtrate volume in $m^3$,
t is the filtration time in s,
A is the filter area in $m^2$,
$\Delta p$ is the pressure difference in Pa,
$w_s$ is the solids concentration in $kg/m^3$ (solids/liquid)
$\eta_f$ is the dynamic viscosity of the filtrate in Pas,
$\alpha$ is the filter cake resistance in m/kg,
$\beta$ is the filter medium resistance in $m^{-1}$.

Using the preparations according to the invention, liquids of plant origin may be stabilized in a particularly advantageous manner against changes in color and taste. The combined use of alkali metal caseinate and crosslinked polymer, owing to the precipitation of the caseinate at the isoelectric point in close association with the crosslinked polymer, achieves an enlargement in surface area, which causes a particularly effective stabilization effect against oxidative changes.

EXAMPLE 1

80 kg of cellulose (a) were suspended in a solution of 10 kg of potassium caseinate (b) in 400 l of water at 60° C. The suspension is atomized at approximately 180° C. at 50 bar via a single-component nozzle and 10 kg of polymer $c_1$), based on 90 kg of potassium caseinate dry product, prepared from 98% of N-vinylpyrrolidone with 2% crosslinker in the form of N,N'-divinylimidazolidin-2-one, are added dry in the atomization zone.

EXAMPLE 2

A formulation consisting of 70 kg of cellulose, 20 kg of potassium caseinate and 10 kg of polymer $d_2$) having a content of N-vinylimidazole (VI) of 90% by weight, a content of N-vinylpyrrolidone (VP) of 7% by weight and a content of N,N'-divinylethyleneurea (DVEU) of 3% by weight was prepared by dissolving the potassium caseinate in 400 l of water at 60° C. and suspending the cellulose therein. The suspension was atomized at 185° C. at 70 bar via a single-component nozzle and the polymer was injected into the atomization zone.

EXAMPLE 3

A formulation consisting of 50 kg of cellulose, 30 kg of potassium caseinate, 10 kg of polymer $c_1$) and 10 kg of polymer $c_2$) was prepared as follows:

The potassium caseinate (b) was dissolved in 320 l of water at 60° C. and the cellulose $c_1$) was suspended therein. The suspension was atomized at 180° C. and 50 bar via a single-component nozzle and a mixture of the two polymers $c_1$) and $c_2$) at a mixing ratio of 1:1 was injected into the atomization zone.

EXAMPLE 4

3 liters of white wine were treated with 3 g of the formulation 1 over a period of 30 minutes. The formulation was resuspended twice in the course of this and was then separated off by means of a single-medium filter using a cellulose bed and charged into bottles having volumes of 0.5 liters.

Table 1 summarizes the results immediately after treatment and bottling and after a storage period of 28 days at 50° C.

TABLE 1

| | without treatment | treated with formulation 1 | |
|---|---|---|---|
| directly after bottling | | | Delta values due to treatment |
| A 320 nm, 0.1 cm | 0.630 | 0.617 | 0.013 |
| A 420 nm, 1.0 cm | 0.098 | 0.089 | 0.009 |
| A 520 nm, 1.0 cm | 0.043 | 0.028 | 0.015 |
| after stress storage | | Delta values: before and after | Delta values: before and after storage |
| A 320 nm, 0.1 cm | 0.799 | 0.757 | 0.757 | 0.014 |
| A 420 nm, 1.0 cm | 0.154 | 0.056 | 0.135 | 0.046 |
| A 520 nm, 1.0 cm | 0.026 | 0.017 | 0.027 | 0.001 |

A: Absorbance at 320, 420, 520 nm; path length in cm

The treatment decreases the browning, expressed as absorbance at 420 nm. After the stress storage, the differences in absorbance at 420 nm and 520 nm indicate that the treated wine has a decreased tendency to change in color than the untreated comparison.

EXAMPLE 5

10 liters of red grape must were treated with 10 g of formulation 2 for a period of 30 minutes. The formulation was continuously resuspended and then separated off via a single-medium filter using a cellulose bed. The treated batch was fermented completely using 0.2 g of pure culture yeast, until $CO_2$ development ceased, was filtered again and bottled in 0.5 liter bottles.

Table 2 shows the results immediately after treatment and bottling and after a storage period of 28 days at 50° C. Bottling was performed with a head space of 150 ml of air.

TABLE 2

| | without must treatment | must treated with formulation 2 |
|---|---|---|
| directly after bottling | | |
| A 420 nm, 1.0 cm | 1.072 | 1.056 |
| A 520 nm, 1.0 cm | 1.305 | 1.325 |
| color [A 420 nm + A 520 nm] | 2.377 | 2.381 |
| hue [A 420 nm/A 520 nm] | 0.821 | 0.767 |
| after stress storage with a head space | | |
| A 420 nm, 1.0 cm | 3.597 | 2.980 |
| A 520 nm, 1.0 cm | 2.643 | 2.676 |
| color [A 420 nm + A 520 nm] | 6.240 | 5.576 |
| hue [A 420 nm/A 520 nm] | 1.361 | 1.113 |

The differences in absorbance at 420 nm confirm that the treated wine has a lower tendency to color changes due to oxidation than the untreated comparison.

EXAMPLE 6

5.0 g or 15.0 g of the formulation 2 according to the invention were added to 10 l aliquots of must from Pinot blanc grapes. A further batch of 10 l received no addition. After a treatment time of 22 h, the liquid phase was taken off from the sediment obtained. The must lees sediments obtained with and without addition of formulation 2 according to the invention were then filtered through an instrumented filter unit having a filter area of 130 cm² at a differential pressure of 0.5 MPa.

Table 3 shows the calculated filter medium resistances β and the mean specific filter cake resistances α of the three batches.

TABLE 3

| Dosage per 10 liters of formulation 2 according to the invention | β in m/kg | α in 1/m |
|---|---|---|
| 0 | $1.5 \cdot 10^{14}$ | $5.6 \cdot 10^{13}$ |
| 5.0 | $1.3 \cdot 10^{14}$ | $4.6 \cdot 10^{13}$ |
| 15.0 | $8.7 \cdot 10^{13}$ | $2.9 \cdot 10^{13}$ |

The filter properties of the must lees suspensions, expressed by decreasing filter medium resistances β and decreasing filter cake resistances α, are markedly improved as a function of the dosage of the formulation added.

We claim:

1. A pulverulent composition, consisting of
   (a) from 10 to 90% by weight of cellulose,
   (b) from 5 to 60% by weight of an alkali metal caseinate, and
   (c) from 5 to 85% by weight of a polymer selected from the group consisting of
   $c_1$) an N-vinyllactam polymer obtained by copolymerization of from 90 to 99.5% by weight of one or more N-vinyllactam monomers and from 0.5 to 10% by weight of a crosslinking monomer,
   $c_2$) a polymer obtained by copolymerization of from 50 to 99.5% by weight of at least one vinyl heterocyclyl monomer having a $pK_a$ of at least 3.8, from 0 to 49.5% by weight of another copolymerizable monomer and from 0.5 to 10% by weight of a crosslinking monomer, and
   $c_3$) a mixture of the polymers $c_1$) and $c_2$).

2. The composition defined in claim 1, comprising potassium caseinate as alkali metal caseinate.

3. The composition defined in claim 1, wherein the polymer component (c) consists of the N-vinyllactam polymer $c_1$).

4. The composition defined in claim 3, wherein the N-vinyllactam polymer $c_1$) comprises copolymerized N-vinylpyrrolidone or N-vinylcaprolactam monomers, or a mixture thereof.

5. The composition defined in claim 1, wherein the polymer component (c) consists of the polymer $c_2$).

6. The composition defined in claim 5, wherein the polymer $c_2$) comprises copolymerized unsubstituted or substituted 5- or 6-membered vinyl heterocyclic monomers, or unsubstituted or substituted benzofused 5- or 6-membered vinyl heterocyclic monomers, wherein the heterocycle has one or two nitrogen ring members.

7. The composition defined in claim 5, wherein the polymer $c_2$) comprises copolymerized N-vinylimidazole monomers, 2-methyl-1-vinylimidazole monomers, 2-vinylpyridine monomers, 4-vinylpyridine monomers or 2-methyl-4-vinylpyridine monomers or a mixture thereof.

8. The composition defined in claim 5, wherein the copolymerizable monomers of the polymer $c_2$) are selected from the group consisting of styrene, acrylic esters, vinyl esters, acrylamides, N-vinyldihydropyridines and N-vinyllactams.

9. The composition defined in claim 5, wherein the copolymerizable monomers of the polymer $c_2$) are selected from the group consisting of N-vinyllactams.

10. The composition defined in claim 5, wherein the copolymerizable monomers of the polymer $c_2$) are selected from the group consisting of 3-methyl-N-vinylpyrrolidone, N-vinylcaprolactam and N-vinylpyrrolidone.

11. The composition defined in claim 1, wherein the polymer component (c) consists of a mixture of the N-vinyllactam polymer $c_1$) and the polymer $c_2$).

12. The composition defined in claim 11, wherein the N-vinyllactam polymer $c_1$) comprises copolymerized N-vinylpyrrolidone or N-vinylcaprolactam monomers, or a mixture thereof.

13. The composition defined in claim 11, wherein the polymer $c_2$) comprises copolymerized unsubstituted or substituted 5- or 6-membered vinyl heterocyclic monomers, or unsubstituted or substituted benzofused 5- or 6-membered vinyl heterocyclic monomers, wherein the heterocycle has one or two nitrogen ring members.

14. The composition defined in claim 11, wherein the polymer component $c_2$) comprises copolymerized N-vinylimidazole monomers, 2-methyl-1-vinylimidazole monomers, 2-vinylpyridine monomers, 4-vinylpyridine monomers or 2-methyl-4-vinylpyridine monomers or a mixture thereof.

15. The composition defined in claim 11, wherein the copolymerizable monomers of the polymer $c_2$) are selected from the group consisting of styrene, acrylic esters, vinyl esters, acrylamides, N-vinyldihydropyridines and N-vinyllactams.

16. The composition defined in claim 11, wherein the copolymerizable monomers of the polymer $c_2$) are selected from the group consisting of N-vinyllactams.

17. The composition defined in claim 11, wherein the copolymerizable monomers of the polymer $c_2$) are selected from the group consisting of 3-methyl-N-vinylpyrrolidone, N-vinylcaprolactam and N-vinylpyrrolidone.

18. A process for the preparation of the composition defined in claim 1, which comprises suspending the cellulose (a) and the polymer component (c) in an aqueous solution of the alkali metal caseinate and subjecting the suspension to spray-drying.

19. A process for the preparation of the composition defined in claim 1, which comprises suspending the cellulose (a) in an aqueous solution of the alkali metal caseinate (b) and atomizing it to give an aerosol which is in a moist state, bringing the moist aerosol into contact with a pulverulent polymer component (c), to give polymer-containing suspension droplets, and drying said suspension droplets.

20. A method for stabilizing a liquid of plant origin, which comprises treating the liquid with an effective amount of the composition defined in claim 1.

21. The method defined in claim 20, wherein the liquid of plant origin is wine, grape must, berry wine, berry must, fruit wine or fruit must.

22. The method defined in claim 20, wherein a hectoliter of the liquid is treated with from 5 to 150 g of the composition.

* * * * *